Figures 1, 2:
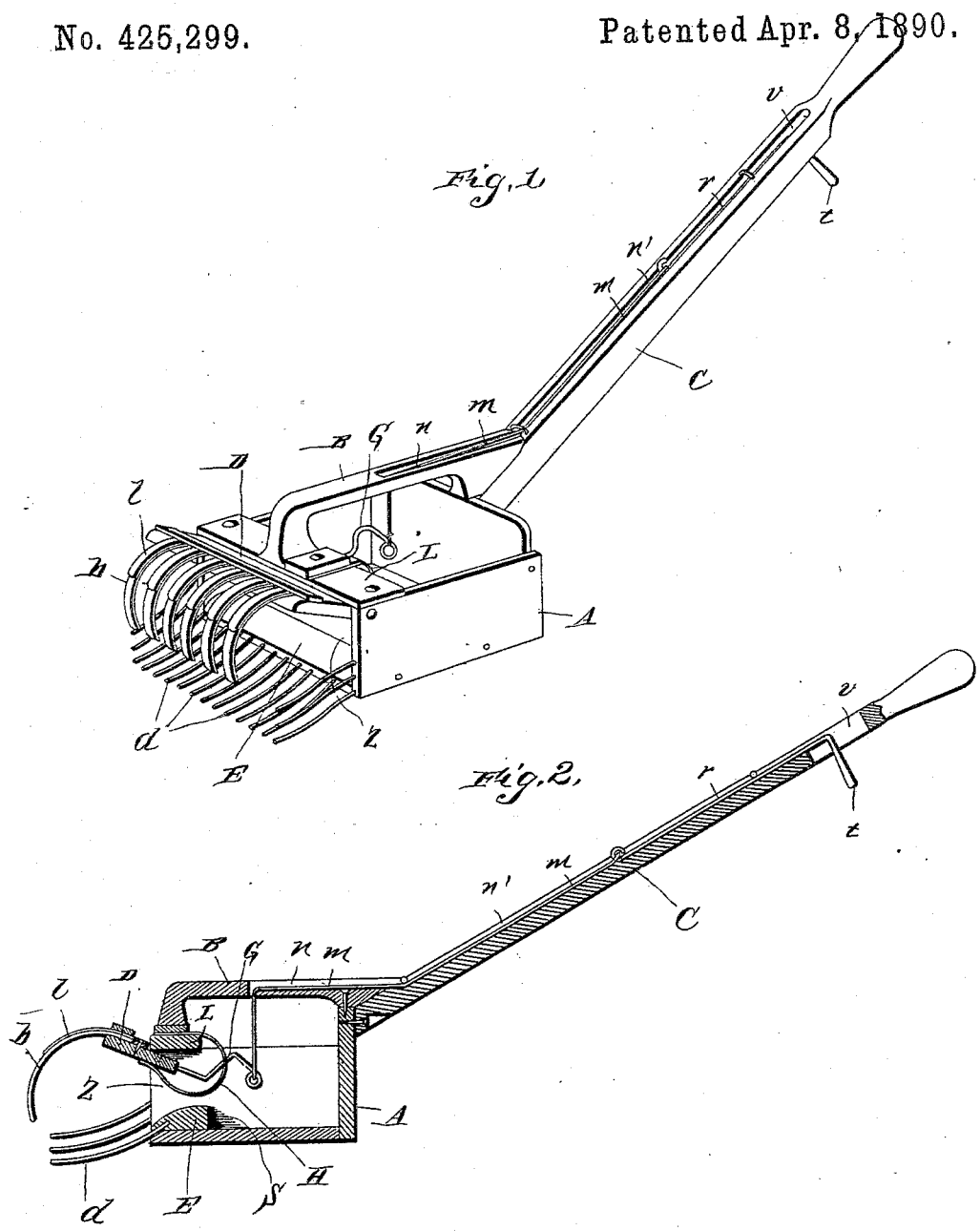

(No Model.)

C. H. CARPENTER & I. BRIGGS.
BERRY PICKER.

No. 425,299. Patented Apr. 8, 1890.

WITNESSES
INVENTORS,
Chas H. Carpenter
Isaac Briggs
by E. W. Anderson
Attorney

UNITED STATES PATENT OFFICE.

CHARLES H. CARPENTER AND ISAAC BRIGGS, OF MIDDLEBOROUGH, MASSACHUSETTS.

BERRY-PICKER.

SPECIFICATION forming part of Letters Patent No. 425,299, dated April 8, 1890.

Application filed September 16, 1889. Serial No. 324,026. (No model.)

*To all whom it may concern:*

Be it known that we, CHARLES H. CARPENTER and ISAAC BRIGGS, citizens of the United States, and residents of Middleborough, in the county of Plymouth and State of Massachusetts, have invented certain new and useful Improvements in Berry-Pickers; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of our berry-picker, and Fig. 2 is a vertical longitudinal section of same.

This invention has relation to devices for picking berries and small fruit from growing plants; and it consists in the novel construction and combination of parts, as hereinafter described, and pointed out in the claim.

In the accompanying drawings, the letter A indicates an open box or receptacle for receiving the berries from the picker-teeth, provided with a short handle B and a long detachable handle C. The front of the box A is open, as at Z, and a bar or frame D, supporting the elastic picker-teeth $b$, is pivoted transversely to the sides near the top and extends along and in front of the mouth of the box. E is a guard secured transversely to the bottom of the box at the open end thereof, and is beveled in front from above downward, as shown. This guard is formed with a rear shoulder S to retain the picked berries in the box. A series of parallel culling-teeth $d$, curved in concave form, project forward horizontally from the lower front edge of the box and from the lower portions of the sides of the same to receive the berries from the spring picker-teeth above and convey them to the receptacle A in the rear.

The series of parallel picker-teeth $b$, which are secured to the upper pivoted bar D, curve downward and forward, and are separated by intervening spaces in which the stems are received to enable said teeth to pull off the fruit. The picker-teeth are broad curved springs, and they are re-enforced in their upper portions by secondary or bearing springs $l$, which support them in their work. The picker-tooth bar D is operated to depress the picker-teeth for engaging the fruit by means of an angular lever-arm G, constructed centrally to the picker-tooth bar, and it is returned to its normal position by a spring H, secured at one end to a transverse brace L on the upper front end of the box A, and bearing by its free end against the under side of the said picker-tooth bar.

When the long handle C is used with the picker, a cord $m$ is attached to the end of the lever-arm and is carried up through the short handle B along a groove $n$ in the top of the latter, extending therefrom along a similar groove $n'$ in the long handle connecting with the groove $n$, as shown. The end of the cord is connected to a rod $r$, having a handle or grip $t$ extending through a slot $v$ near the end of the handle. The short handle B is secured in front to the transverse brace L and in rear to the top of the back of the box, spanning the opening of the latter just above the lever-arm, and it is used without the long handle and its cord-connections when working in close relation to berry-bushes, the lever-arm being operated by the fingers of the hands grasping the handle. The long handle is detachably secured in an oblique manner to the rear of the box A and to the rear projection of the short handle, as shown, and when in use the picker-teeth are operated by manipulating the rod and cord attachments connected therewith.

What we claim as new, and desire to secure by Letters Patent, is—

In a fruit and berry picker, the combination, with the receptacle and its short handle, the culling-teeth projecting from said receptacle, and the pivoted front bar carrying the picker-teeth, of the lever-arm of said front bar, the long grooved and slotted detachable handle, the cord, and its operating-rod, substantially as specified.

In testimony whereof we affix our signatures in presence of two witnesses.

CHARLES H. CARPENTER.
ISAAC BRIGGS.

Witnesses:
ABNER W. SNOW, Jr.,
GEORGE W. BRYANT.